(12) United States Patent
Waters

(10) Patent No.: US 6,406,144 B1
(45) Date of Patent: Jun. 18, 2002

(54) EYEGLASS APPARATUS

(76) Inventor: Michael Waters, 372 Bateman Cir. North, Barrington Hills, IL (US) 60010

( * ) Notice: Subject to any disclaimer, the term of this patent is extended or adjusted under 35 U.S.C. 154(b) by 0 days.

(21) Appl. No.: 09/772,022

(22) Filed: Jan. 29, 2001

(51) Int. Cl.[7] ................................................. G02C 3/04
(52) U.S. Cl. .............................. 351/56; 351/59; 351/63
(58) Field of Search .............................. 351/41, 56, 59, 351/63, 158; 206/5

(56) References Cited

U.S. PATENT DOCUMENTS

| | | | | |
|---|---|---|---|---|
| 654,005 | A | * 7/1900 | Kabisch | 351/56 |
| 683,064 | A | * 9/1901 | Osborn et al. | 351/56 |
| 1,892,642 | A | 12/1932 | Gaspari | 351/63 |
| 1,899,664 | A | * 2/1933 | Blocker | 351/56 |
| 2,443,422 | A | 6/1948 | Hansen | 351/63 |
| 4,707,088 | A | 11/1987 | Tabacchi | 351/56 |
| 5,793,462 | A | 8/1998 | Sample et al. | 351/41 |
| 6,033,068 | A | 3/2000 | Spilkin et al. | 351/112 |
| 6,145,986 | A | * 11/2000 | Conner | 351/158 |

\* cited by examiner

*Primary Examiner*—Huy Mai
(74) *Attorney, Agent, or Firm*—Fitch, Even, Tabin & Flannery

(57) ABSTRACT

An eyeglass apparatus is provided including a pair of lenses and a housing therefor in which the lenses are disposed in a stowed position and are able to be shifted to a use position while still connected to the housing. The lenses are operably connected to a pivot mount, so that they pivot into and out from the housing to provide for space conservation in the housing. A detent is provided between the lenses and housing which releasably maintains the lenses in their stowed position and is operable via an actuator to allow the lenses to shift to their use position where the housing preferably is between the lensee to be used as a handle. In this form, the housing includes opposite side openings, and there is a biasing mechanism that urges the lens assemblies out through the side openings. The viewing lenses are kept attached to the housing whether in the stowed or use position thereof so as to prevent their separation from each other, and the potential for loss that this creates. In addition, the preferred small size of the present housing maintains a compact form for the apparatus herein when not in use to enable it to be easily transported such as in a user's pocket or the like. The small size of the present eyeglass apparatus allows it to incorporate additional features without creating a significant increase in its size, i.e., light module, digital memo recorder module, and/or a writing portion.

25 Claims, 8 Drawing Sheets

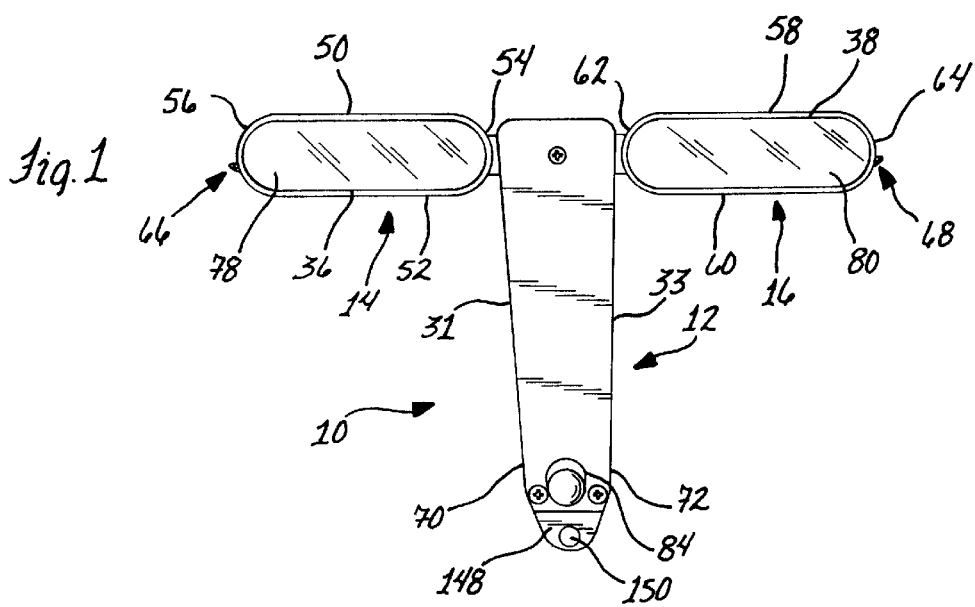
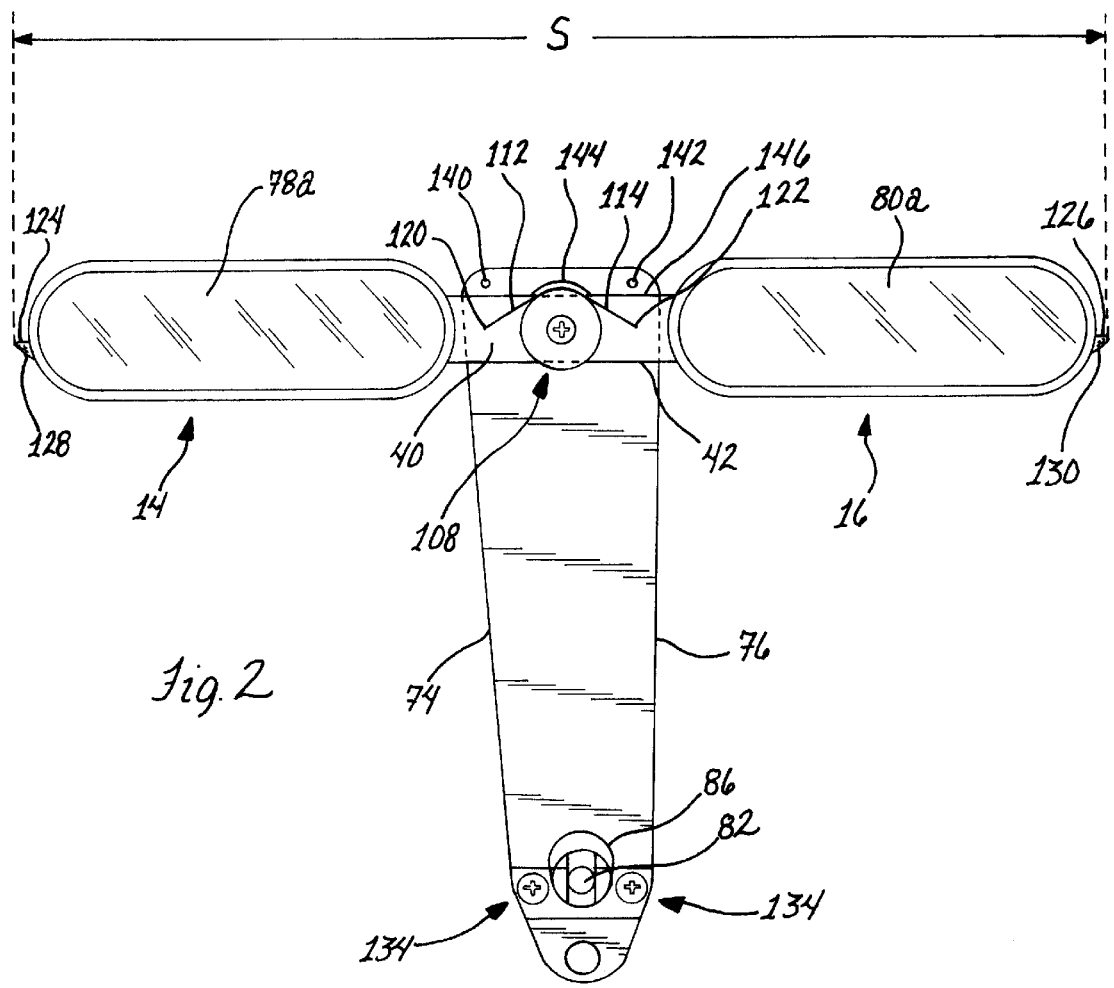

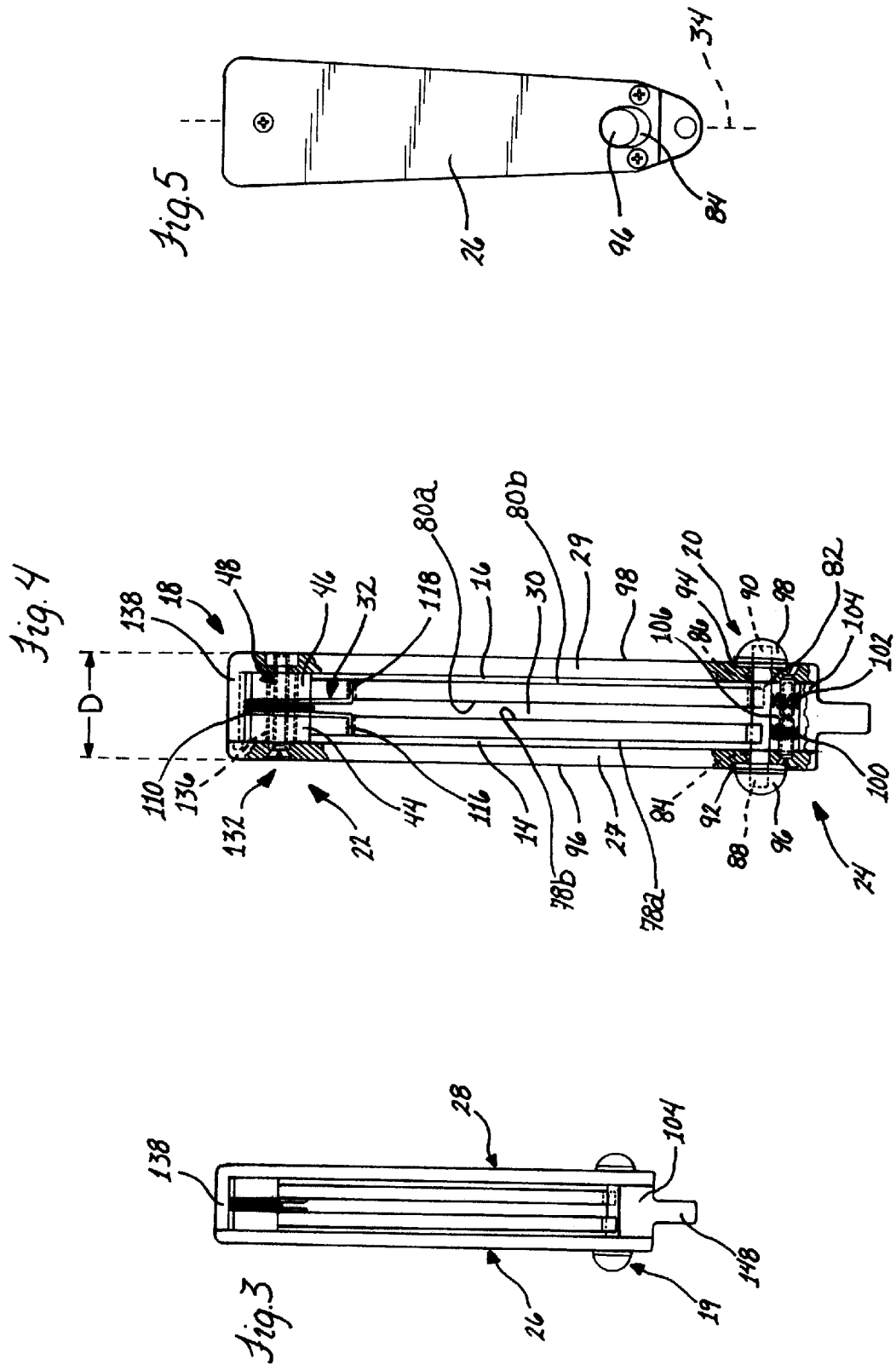

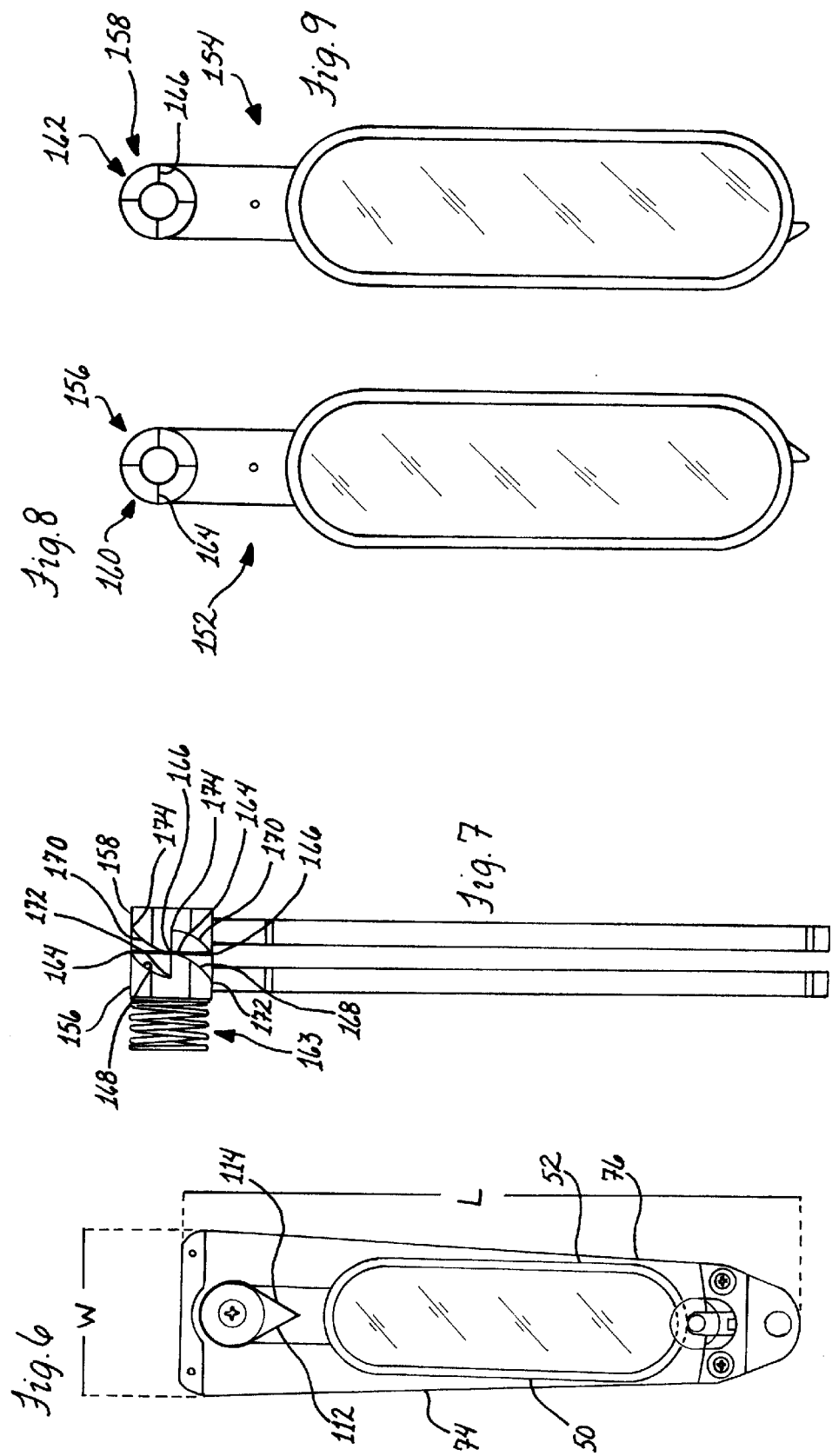

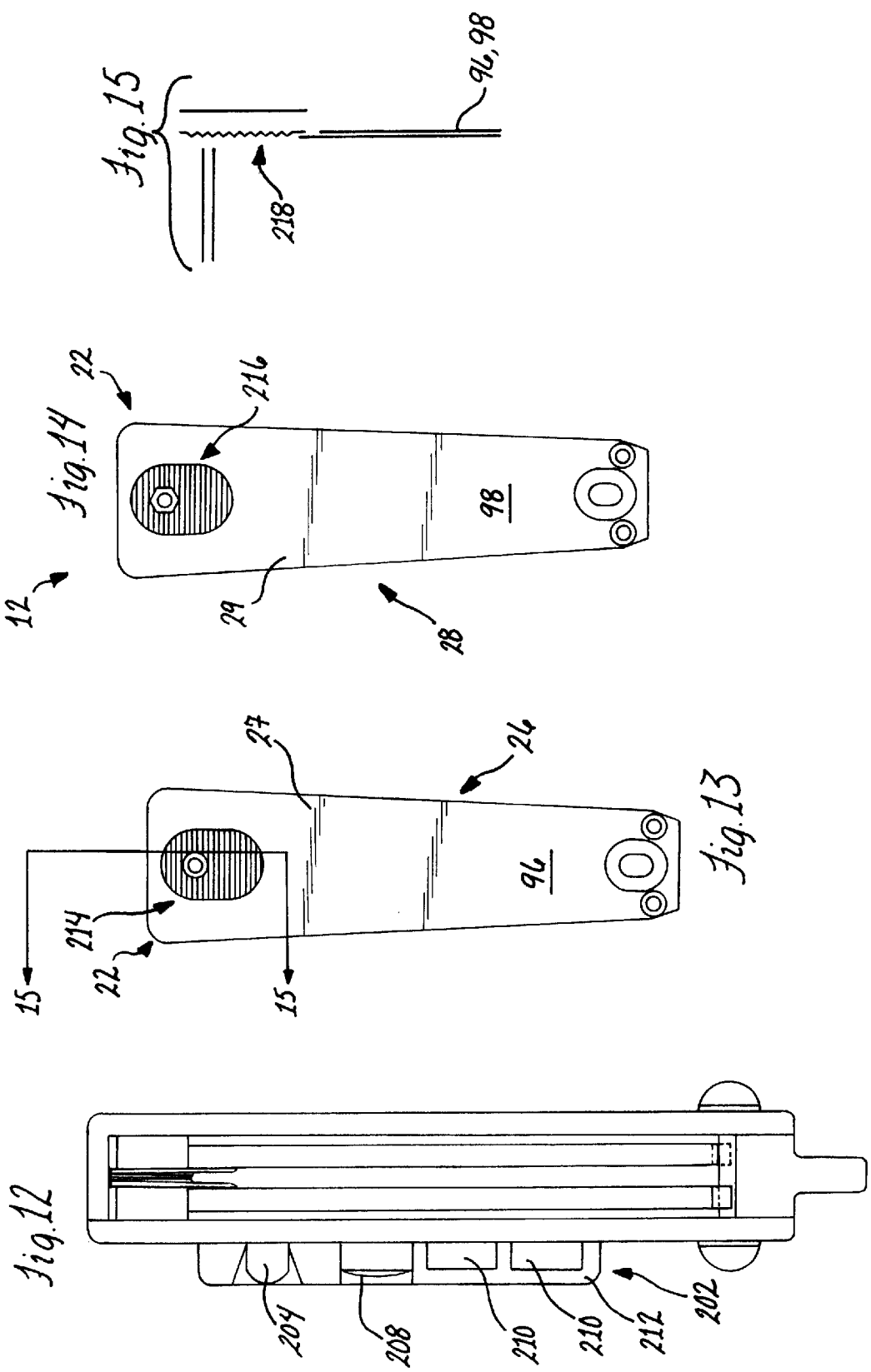

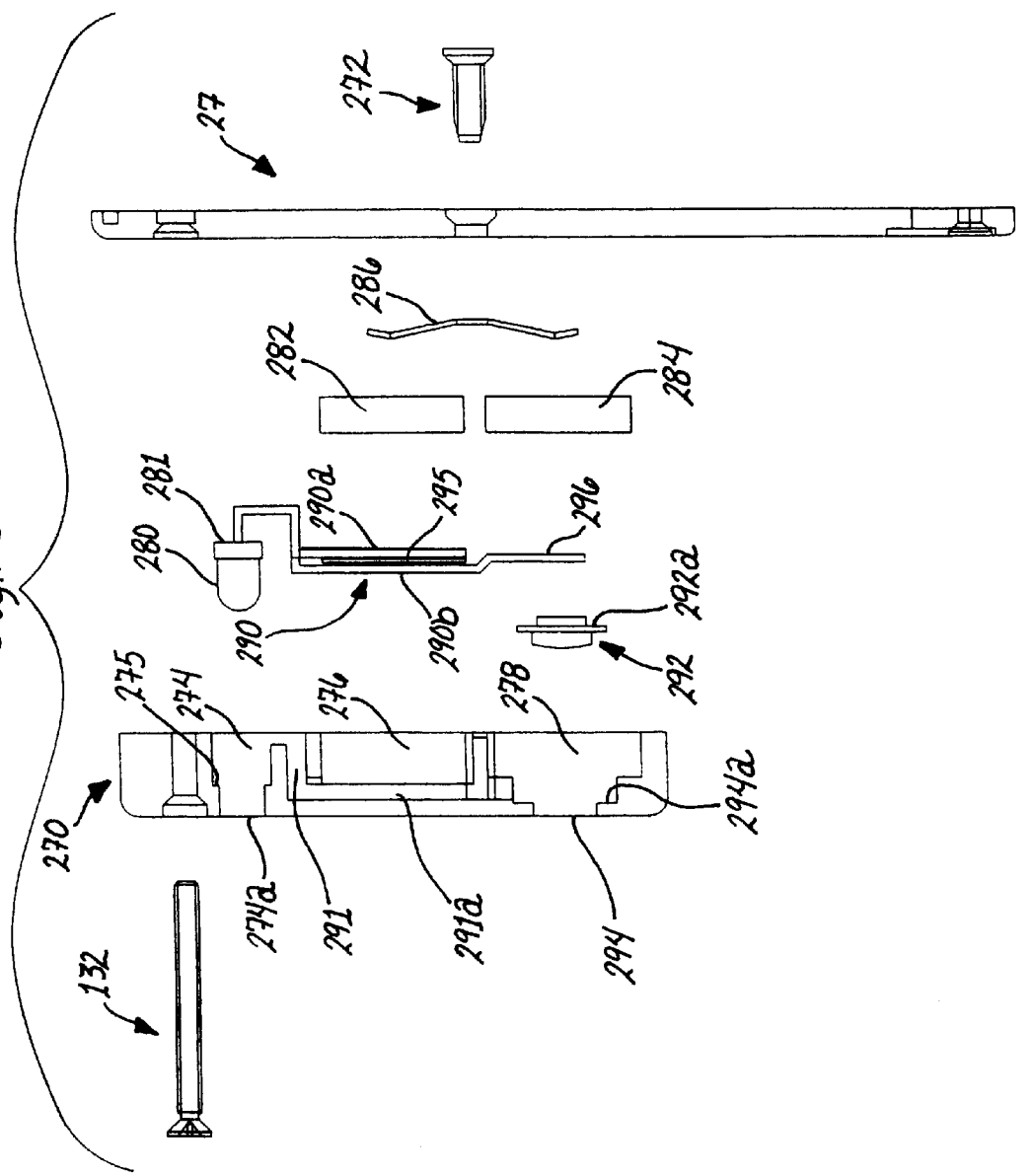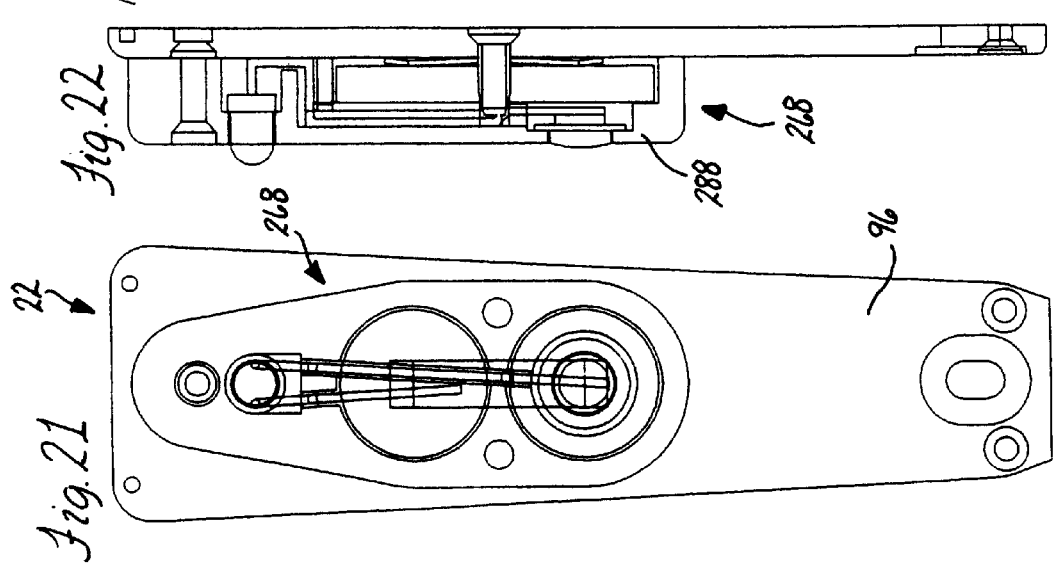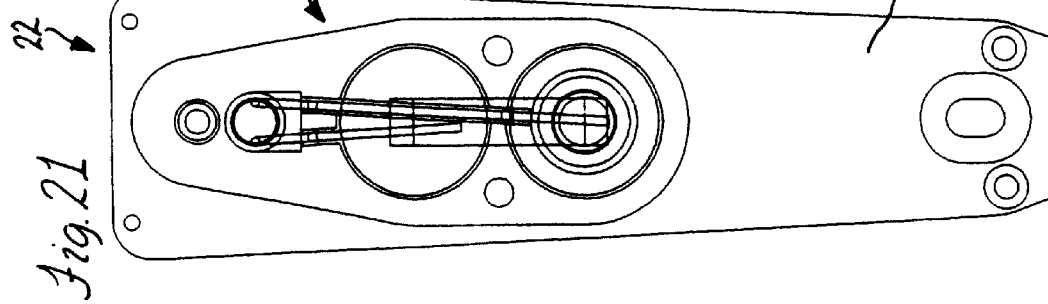

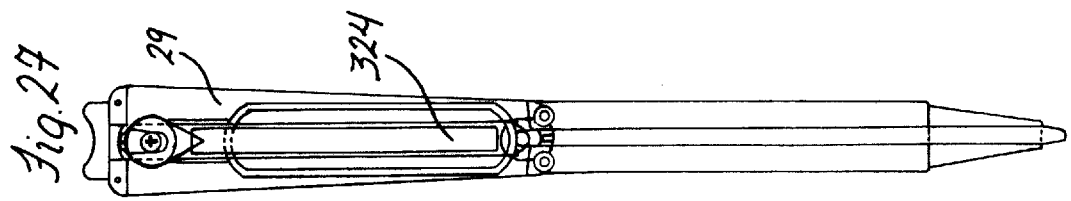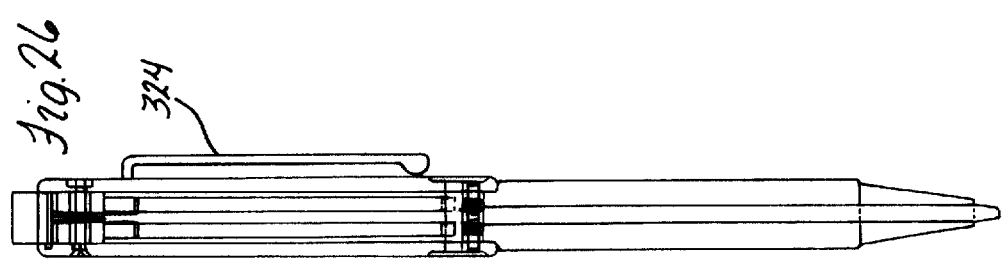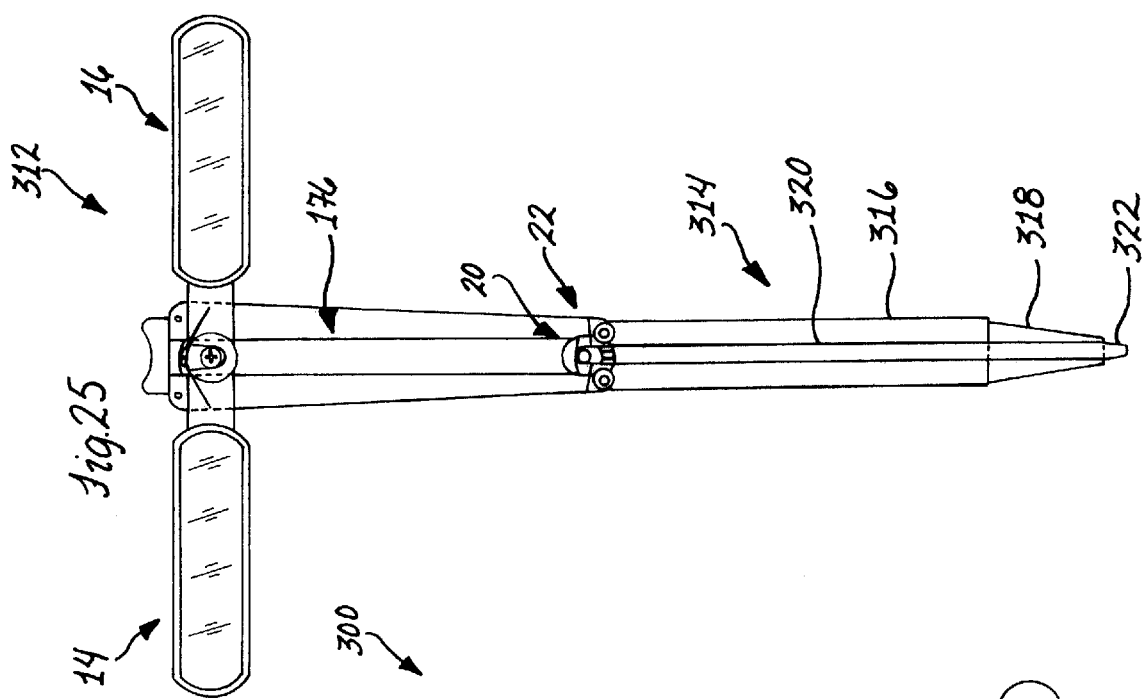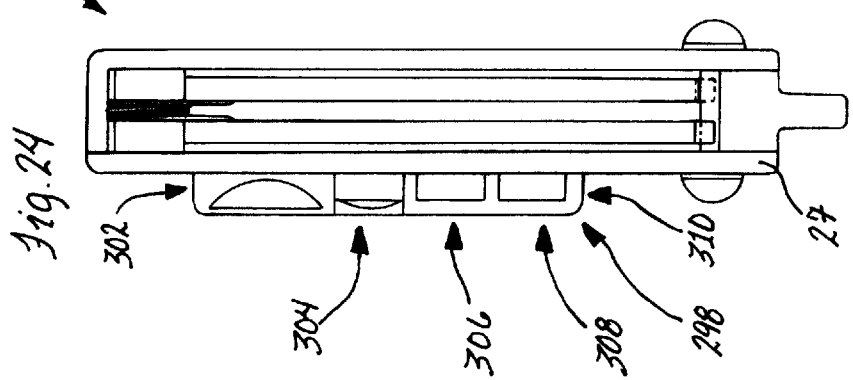

EYEGLASS APPARATUS

FIELD OF THE INVENTION

The invention relates to eyegladsses and, more particularly, to eyeglasses having a compact housing therefor.

BACKGROUND OF THE INVENTION

The typical pair of eyeglasses are usually provided with a soft or hard case so that they can be carried about when not in use. Where people only need glasses for reading or do not like to wear their glasses all of the time, the cases are an important accessory as they protect them from damage. One problem with these cases is in their size as they have to be large enough to accommodate the glasses with their temple arms folded against the lenses. Thus, the cases are slightly larger than the size of the standard folded-up pair of reading glasses. This size of the cases does not permit them to be readily fit into most pockets on clothing. Accordingly, absent some sort of carrying bag or pouch for holding the case, eyeglasses that are only used periodically such as for reading are usually left at home and thus not otherwise available to their owners.

There are a number of eyeglasses that allow for various components thereof to shift relative to each other so as to allow the glasses to be folded down to an even more compact configuration than is common. However, these glasses are generally limited in terms of how compactly they can be folded as they generally fold out to commonly known use configurations with the typical components including a nose or bridge portion extending between the lens frames and temple arms extending rearwardly from outer ends of the respective lens frames. As such, oftentimes these glasses even in their compact, folded form are larger or bulkier than is desirable for easy transport thereof, such as in the pocket of a person's clothing.

It is also less than desirable to have reading glasses that are regularly being removed from and put back into their cases. As the cases are separate from the glasses, this constant removal and replacement of the glasses from and into the case increases the likelihood that the case may be misplaced or lost. In this instance, a new case that fits the glasses will have to be bought, at some inconvenience to the user or the glasses simply go caseless increasing the likelihood of damage thereto.

Accordingly, there is a need for an eyeglass apparatus that has a compact form which allows the glasses to be easily carried about. Further, a compact eyeglass apparatus is needed that ensures that the lenses can be protected when not in use.

SUMMARY OF THE INVENTION

In accordance with the invention, an eyeglass apparatus is provided including a pair of lenses and a housing therefor in which the lenses are disposed in a stowed position and are able to be shifted to a use position while still connected to the housing. In a preferred form, the lenses are operably connected to a pivot mount, so that they pivot into and out from the housing to provide for space conservation in the housing. In another aspect, a detent is provided between the lenses and housing which releasably maintains the lenses in their stowed position and is operable to allow the lenses to shift to their use position where the housing is between the lenses to be used as a handle. In another aspect, the housing includes opposite side openings, and there is a biasing mechanism that urges the lens assemblies out through the side openings.

As is apparent, the viewing lenses are kept attached to the housing whether in the stowed or use position thereof so as to prevent their separation from each other, and the potential for loss that this creates. In addition, the preferred small size of the present housing maintains a compact form for the apparatus herein when not in use to enable it to be easily transported such as in a user's pocket or the like. In a preferred form, the compact housing can include a pendant portion to allow the eyeglass apparatus herein to be carried on a keyring.

BRIEF DESCRIPTION OF THE DRAWINGS

FIG. 1 is an elevational view of an eyeglass apparatus in accordance with the present invention showing a housing disposed between a pair of lenses shifted to their operative use position;

FIG. 2 is a view similar to FIG. 1 with a portion of the housing removed to show the internal operating components of the apparatus including a pivot mount and biasing mechanism for pivoting the lenses to their use position, and a detent operable to retain the lenses in their stowed position and release the lenses for pivoting to their use position;

FIG. 3 is a side elevational view of the apparatus of FIG. 1 showing the lenses pivoted into the housing to their stowed position;

FIG. 4 is a view similar to FIG. 3 with a portion of the housing removed to show the pivot mount including pivot shaft on which collars of the lenses are mounted and the detent including a spring biased lock shaft including enlarged actuator heads at either end;

FIG. 5 is an elevational view of the eyeglass apparatus of FIG. 1 showing the lenses pivoted to their stowed position with the detent lock shaft in its locked position;

FIG. 6 is a view similar to FIG. 5 with a portion of the housing removed to show a cam of one of the lenses engaged against the lock shaft biased to its locked position;

FIG. 7 is a side elevational view of an alternate pair of lenses having cam surfaces on the collars thereof;

FIG. 8 is an elevational view of one of the lenses including the collar cam surfaces thereof;

FIG. 9 is an elevational view of the other lens including the collar cam surfaces thereof;

FIG. 12 is a side elevational view of the lighted eyeglass apparatus of FIG. 11 showing a light, a switch and batteries in the lighting module with the lenses pivoted to their stowed position;

FIG. 13 is an elevational view of an apparatus similar to the apparatus of FIGS. 1–6 including a gripping area near one end of the housing on a wall thereof;

FIG. 14 is a view similar to FIG. 13 showing another gripping area on the opposite wall of the housing;

FIG. 15 is a schematic view of the gripping areas of FIGS. 13 and 14 taken along line 15—15 of FIG. 13 showing gripping ridges formed in the gripping area;

FIG. 21 is an elevational view of another lighting module for a lighted eyeglass apparatus;

FIG. 22 is a side elevational view of the lighting module of FIG. 21 showing the attachment thereof to one of the cover walls of the eyeglass apparatus housing;

FIG. 23 is an exploded view of the lighting module and housing wall of FIG. 22;

FIG. 24 is a side elevational view of an eyeglass apparatus similar to the apparatus of FIGS. 1–6 and including a digital memo recorder module attached thereto; and FIGS. 25–27 are views of an eyeglass apparatus similar to that shown in FIG. 10 and having writing portion attached thereto.

DETAILED DESCRIPTION OF THE PREFERRED EMBODIMENTS

Figure 10:
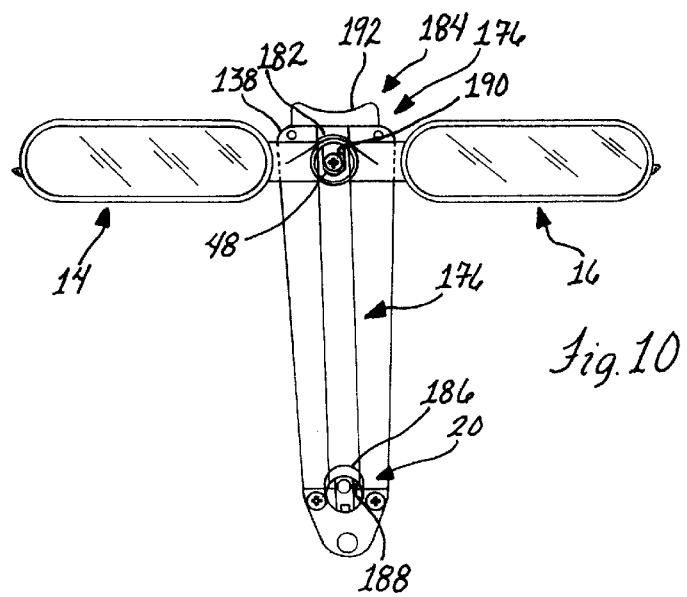
FIG. 10 is an elevational view of an alternative eyeglass apparatus including a push actuator for operating the detent showing a contoured surface on an enlarged head of the actuator and an elongate operating rod for shifting the lock shaft.

Referring to FIGS. 1–6, an eyeglass apparatus 10 in accordance with the present invention is illustrated. The apparatus 10 includes a small, compact housing 12 and a pair of lenses or lens assemblies 14 and 16 having a use position extended out from the housing (FIGS. 1 and 2) and a stowed position shifted into the housing 12 (FIGS. 3–6). In both the operative, use position and the stowed position, the lenses 14 and 16 are operatively connected to the housing 12 via a pivot mount, generally designated 18, as best seen in FIG. 4. The mount 18 attaches the lenses 14 and 16 to the housing 12 so that they pivot between the use and stowed positions thereof. In this regard, the lenses 14 and 16 are pivoted so that they overlap when in the stowed position in the housing 12 to provide for space conservation therein, as will be described more fully hereinafter. This allows the housing 12 to have a compact configuration which, in turn, allows a user to easily carry the apparatus 10 about, such as in their clothing pockets.

Continuing reference to FIG. 4, the lenses 14 and 16 are releasably retained in the stowed position by a detent or latching mechanism, generally designated 20. The pivot mount 18 and the detent 20 are generally disposed at opposite end portions 22 and 24 of the housing 12. Operation of an actuating or release mechanism 19 for the detent 20 releases the lenses 14 and 16 from their stowed position for pivoting about pivot mount 18 to the use position. The housing 12 has a length L between the ends 22 and 24 and a transverse width W that are sized to accommodate each of the lenses 14 and 16 pivoted to their stowed position in the housing 12. Similarly, the depth D of the housing 12 is sized to accommodate both of the lenses 14 and 16 when stowed in overlapping relation to each other, as best seen in FIGS. 3 and 4. The housing 12 can be of a hard plastic material such as polycarbonate to provide it with durability and for protection of the lenses 14 and 16. The dimensions L, W, and D of the housing 12 are such that it has a very small, compact configuration with the lenses 14 and 16 stowed therein so that a person can easily transport the present eyeglass apparatus 10 as by fitting it in a pocket on their clothing.

The present eyeglass apparatus 10 is able to be provided in its compact form in part due to the omission of temple arms extending back from the lenses 14 and 16 which common eyeglasses employ so a user can support the eyeglasses with their ears, as is known. To this end, the eyeglass apparatus 10 is not adapted to be worn like common eyeglasses, and instead, the housing 12 is adapted to be used as a handle with the lenses 14 and 16 in their operative position for viewing therethrough.

In the preferred and illustrated form, with the lenses 14 and 16 shifted to their use position, the housing 12 generally will be disposed between the lenses 14 and 16, as shown in FIGS. 1 and 2. The user can hold the housing 12 to position the lenses 14 and 16 in front of their eyes for viewing therethrough. For best viewing, the user can hold the housing 12 to extend upwardly from between the eyes with the lenses 14 and 16 aligned with the eyes so that when a user looks through the lenses, typically down at print, the housing 12 will not be an impediment to their view.

As best seen in FIGS. 3 and 4, the housing 12 can include a pair of cover members 26 and 28 including respective flat walls 27 and 29 having the same length L and width W as each other. The cover members 26 and 28 are attached at the housing ends 22 and 24 so that the walls 27 and 29 are in spaced relation from each other to define the depth D of the housing 12 and forming an internal housing space 30 therebetween. As the walls 27 and 29 are substantially flat plate-like members, the internal housing space 30 is open at either side 31 and 33 thereof so as to form side openings through which the respective lenses 14 and 16 are shifted between their stowed and use positions. As mentioned, the lenses 14 and 16 are held in the stowed position in the housing internal space 30 via detent 20. In the stowed position, a shift or biasing mechanism 32 urges the lenses 14 and 16 out from the housing space 30 through the side openings to their use position. Accordingly, operation of the actuating mechanism 19 releases the lenses 14 and 16 so that they shift through the side openings 31 and 33 under the influence of the biasing mechanism 32 to their use position. As will be described more fully herein, when the actuating mechanism 19 is operated to shift the detent 20 for releasing the lenses 14 and 16 from their stowed position, the lenses 14 and 16 can simultaneously shift though their associated side openings 31 and 33 between the cover members 27 and 29 via the biasing mechanism 32.

As mentioned, the housing 12 preferably includes plate-like walls 27 and 29 cooperating to form the internal housing space 30 in which the lenses 14 and 16 are stowed. The housing 12 includes a longitudinal axis 34 extending along its length L and between the opposite ends 22 and 24 thereof. The lenses 14 and 16 are distinct from each other and include respective rigid frames 36 and 38 such as of a stainless steel material and each are connected to an extension portion 40 and 42 thereof. Ends 44 and 46 of the extension portions 40 and 42 are formed as annular collars which are mounted on a pivot shaft 48 of the pivot mount 18 in the housing space 30, as shown in FIG. 4. The pivot shaft 48 extends between the housing members 27 and 29 at the housing upper end 22.

Referring to FIGS. 1, 2 and 6, there it can be seen that the preferred lenses 14 and 16 have a flattened oval or obround shape. Accordingly, the lens frame 36 includes flat parallel side portions 50 and 52 interconnected by arcuate end portions 54 and 56, and the lens frame 38 includes flat parallel side portions 58 and 60 interconnected by arcuate end portions 62 and 64. The end portions 54 and 62 are integrally connected with the respective extension portions 40 and 42 such that the arcuate end portions 56 and 64 are at the outer ends of the frames 36 and 38 with the lenses 14 and 16 pivoted to their operative, use position. Cams 66 and 68 are provided on the respective lenses 36 and 38 at the arcuate outer end portions 56 and 64 thereof. The cams 66 and 68 cooperate with the detent 20 to allow the lens assemblies 14 and 16 to be pivoted to their stowed position and held in the housing internal space 30. Operation of the detent 20 via the actuating mechanism 19 allows the lenses 14 and 16 to pivot back to their operative positions, as previously described.

Thus, with the lenses 14 and 16 stowed in the housing 12, the ends 44 and 46 of the lens assemblies 14 and 16 will be disposed at the housing end 22 where the pivot mount 18 is located and with the opposite ends 56 and 64 of the lens assemblies 14 and 16 disposed at the opposite end 24 of the housing 12 where the detent 20 is located such that the lens assemblies 14 and 16 extend along their length between the ends 40 and 56 of lens assembly 14 and the ends 42 and 64 of lens assembly 16 generally in the direction of the housing longitudinal axis 34. Further, because the shape of the lens frames 36 and 38 has a relatively narrow width across their parallel sides 50 and 52 and 58 and 60, the width W of the housing can likewise be relatively small, as can be seen in FIG. 6.

Accordingly, the housing member walls 27 and 29 can each have an elongate shape extended along axis 34 and taper from their greatest width at housing end 22 to their minimum width at housing end 24. In this regard, the housing member wall 27 has sides 70 and 72 which taper toward each other as they extend from housing end 22 to housing end 24. Likewise, the housing member wall 29 has sides 74 and 76 that taper toward each other from housing end 22 to housing end 24. It is preferred that even at their minimum spacing from each other that the sides 70 and 72 of housing member wall 27 and the sides 74 and 76 of housing member wall 29 are as wide or wider than the spacing between the sides 50 and 52 of lens assembly frame 36 and the sides 58 and 60 of lens assembly frame 38. In this manner, light refractive glass or plastic portions 78 and 80 held in the frames 36 and 36 of respective lens assemblies 14 and 16 do not project external of the housing space 30 through the side openings 31 and 33 to maximize the protection afforded thereto by the housing cover members 26 and 28, which preferably are of a hard plastic material as mentioned.

The light refractive portions 78 and 80 each include opposite surfaces 78a and 78b, and 80a and 80b. Preferably, the lens portions 78 and 80 are of the type that corrects for defects in vision due to errors of refraction in the human eye, and thus, at least one of the surfaces of each portion will normally be configured to precisely correct the defect being addressed in a particular individual that wishes to use the eyeglass apparatus 10 herein. A variety of lens types may be utilized including concave, convex, plano-convex, cylindrical, compound lenses and/or bi, tri, or tetrafocal lenses, although the eyeglass apparatus 10 is preferably adapted for use by those who are farsighted so that convexly configured lens portions 78 and 80 will typically be employed. The opposite surfaces 78a, 78b and 80a, 80b are each preferably formed with a substantially smooth configuration to provide the lens portions 78 and 80 with a well-defined diopter rating for precision optics and high resolution with a minimum of blurring or distortion so that there is crystal clear magnification when using the eyeglass apparatus 10 herein. In this regard, the apparatus 10 can be provided with lens portions 78 and 80 of different diopter ratings so a user can select the appropriate strength for their particular vision needs. For instance, eight different diopter lens portions 78 and 80 can be provided starting at 1.25 in the medium strength range and incrementing by 0.25 up to 3.00 in the extra strong range.

With the lens assemblies 14 and 16 stowed in their overlapping position in the housing 12, the lens surfaces 78b and 80a will be aligned with and in facing relation to each other. In this manner, the dimensions of the housing 12 along the length L and width W need only accomodate the size a single one of the lens assemblies since the are in substantially complete overlap alignment with each other, as depicted in FIG. 6.

The actuating mechanism 19 and detent 20 will next be more particularly described with reference to FIGS. 4 and 6. The detent 20 can include a lock member in the form of lock shaft 82 that extends between the housing walls 27 and 29 at the housing end 24. Through apertures 84 and 86 are formed in the housing walls 27 and 29 aligned across the housing space 30 from each other with opposite shaft ends 88 and 90 projecting through the respective apertures 84 and 86.

The housing walls 26 and 28 each can include an area 92 and 94 recessed from respective outer surfaces 96 and 98 of the walls 27 and 29. The through apertures 84 and 86 open to the wall outer surfaces 96 and 98 in the recessed areas 92 and 94 and have an elongated form to accommodate shifting of the lock shaft 82 therein the axial direction along the length of the housing 12. At the shaft ends 88 and 90, enlarged actuator heads 96 and 98 are provided thereon. The actuator button heads 96 and 98 seat in the recessed areas 92 and 94 during shifting of the lock shaft 82 in the apertures 84 and 86. As can be seen in FIGS. 1, 2 and 4, the elongate apertures 84 and 86 are very short in length so that there is only a small amount of axial shifting allowed for the lock shaft 82.

The lock shaft 82 is biased to its locked position by a pair of small coil springs 100 and 102 supported in a spring mounting block 104 at housing end 24 spanning the housing walls 27 and 29. The mounting block 104 includes a cavity 106 in which the springs 100 and 102 are received. The lock shaft 82 resides against one end of the springs 100 and 102 with the other end of the springs seated on the mounting block 104 in the cavity 106 thereof so that the lock shaft 82 is urged away from housing end 24 toward housing end 22 to its locked position. In the locked position, the shaft 82 is urged against the ends of the apertures 84 and 86 distal from the housing end 24.

To release the lenses 14 and 16 for pivoting to their operative positions, a user operates the actuator mechanism 19 by engaging the lock shaft actuator heads 96 and 98 to shift them against the bias afforded by the springs 100 and 102 back toward the end of the apertures 84 and 86 proximate the housing end 24 in the release position thereof. In this regard, a user can grasp the housing 12 near its end 22 with one hand and pull on the actuator heads 96 and 98 with their other hand to release the lenses 14 and 16 for pivoting to their operative positions. Thus, the present eyeglass apparatus 10 opens or shifts to its operative position merely by a flick or pull of the button heads 96 and 98 the small distance necessary to shift them axially to the release position.

With the lock shaft 82 in the release position, the cams 66 and 68 of the lens assemblies 14 and 16 are provided with clearance so that the biasing mechanism 32 shifts both of the lenses 14 and 16 simultaneously to their operative position. It is preferred that the biasing mechanism 32 include a single spring 108 in the form of a torsion spring. The torsion spring 108 has coils 110 mounted about the pivot shaft 48, as best seen in FIG. 4. Arms 112 and 114 extend from the coils 110 of the torsion spring 108 with each having respective bent ends 116 and 118. The torsion spring 108 is connected to the lenses 14 and 16 by inserting the arm ends 116 and 118 into respective apertures 120 and 122 in the extension end portions 40 and 42 of the lens assemblies 14 and 16.

The spring arms 112 and 114 are biased in a pivotal direction away from each other and toward the end 22 of housing 12. As best seen in FIG. 6, when the lens assemblies 14 and 16 are in their stowed position in the housing internal space 30, the spring arms 112 and 114 are moved toward each other against their bias so that their ends 116 and 118 are aligned with each other. In this manner, the lens assemblies 14 and 16 are spring loaded in the housing 12 toward their operative position with the detent 20 including the lock shaft 82 biased to its locked position and the lens assembly cams 66 and 68 or either side thereof cooperating to retain the lens assemblies 14 and 16 in the housing 12 against the bias provided by the spring 108.

More specifically, the cams 66 and 68 include respective abutment surfaces 124 and 126. The abutment surfaces 124 and 126 generally extend in the direction of the housing axis 34 with the lens assemblies 14 and 16 pivoted into the housing 12 in their stowed position in space 30 thereof such that the abutment surfaces 124 and 126 engage against either side of the lock shaft 82 in the locked position thereof. The interfering engagement between the abutment surfaces 124 and 126 with the shaft 82 in its locked position prevents the cams 124 and 126 from clearing the shaft 82 for being pivoted out from the housing space 30 to their operative positions. For this purpose, a user needs to shift the lock shaft 82 via the actuator heads 96 and 98 thereof external of the housing space 30 toward its release position against the bias provided by springs 100 and 102 to such an extent to allow the abutment surfaces 124 and 126 to clear the shaft 82 thus allowing the torsion spring arms 112 and 114 to pivot the associated lens assemblies 14 and 16 to their operative position.

For shifting the lens assemblies 14 and 16 back to their stowed position, the cams 66 and 68 include respective cam surfaces 128 and 130. The cam surfaces 128 and 130 are oriented such that they are inclined relative to the housing axis 34 with the lens assemblies 14 and 16 in their stowed position. Thus, when pivoting the lens assemblies 14 and 16 back toward their stowed position, the inclined cam surfaces 128 and 130 will cammingly engage against the lock shaft 82 in its locked position. Continued pivoting of each one of the lens assemblies 14 and 16 causes the surfaces 128 and 130 to cam against the shaft 82 shifting it toward housing end 24 and the release position against its spring bias until the respective junctures of the cam surfaces 128 and 130 with the abutment surfaces 124 and 126 of the cams 66 and 68 clear the shaft 82. At this time, the shaft 82 shifts back to the locked position under the influence of the springs 100 and 102 to be in interference with the abutment surfaces 124 and 126 on either side thereof.

The housing members 26 and 28 can be attached by fastener 132 at the housing end 22 and a pair of fasteners 134 at the housing end 24. As seen in FIG. 4, the fastener 132 is received in aligned apertures in the housing member walls 27 and 29. A cylindrical bearing member 136 can be press fit on the shank of the fastener 132 so that together the fastener 132 and cylindrical member 136 form the pivot shaft 48. The cylindrical member 136 is preferably of a low friction plastic material to act as a bearing for the annular collar portions 44 and 46 of the respective lens assemblies 14 and 16 for pivoting thereabout The housing member 28 can have an L-shaped profile with a end wall portion 138 extending transverse to the housing wall surface 98 and including a pair of small bosses 140 and 142 for fitting in corresponding apertures of housing member 26 at the upper end 22 of the housing 12, as best seen in FIGS. 2 and 4. The end wall 138 serves as a stop for the lens assemblies 14 and 16 when pivoted to their use position. As shown in FIG. 2, when the lock shaft 82 is shifted to its release position, the spring arms 112 and 114 pivot their associated lens assemblies 14 and 16 generally oppositely to each other through the opposing side openings 31 and 33 of the housing 12. The arms 112 and 114 of the torsion spring 108 pivot the lens assemblies 14 and 16 until the extensions 40 and 42 thereof are brought into engagement with inner surface 146 of the housing end wall 138 at which position the lens assemblies 14 and 16 are ready for viewing therethrough. In the use position, the lens assemblies 14 and 16 extend oppositely and in alignment with each other generally perpendicular to the housing axis 34 and have a spacing between each other generally corresponding to the spacing commonly provided between lenses of typical eyeglasses. The distance S between outer ends 56 and 64 of the respective lens assemblies 14 and 16 in their use position can be approximately four inches with each lens assembly frame 34 and 36 having a length between their ends slightly greater than one and a half inches, leaving a spacing of slightly greater than three-fourths of an inch between inner ends 54 and 62 of the lens assembly frames 34 and 36. In the preferred and illustrated form, each of the lens assemblies 14 and 16 pivot through an angular range of approximately 90 degrees between the stowed and use positions thereof.

The above described pivoting of the lens assemblies 14 and 16 such that they are in overlapping relation to each other in the stowed position in the housing 12 allows for the housing 12 to take on a very compact configuration. In other words, because the lens assemblies 14 and 16 are of substantially identical construction, when they are in their overlapping position each centrally aligned with the housing axis 34 in the stowed position in the housing 12, the width W and length L of the housing 12 can be sized to cover and protect a single one of the lenses as their footprint in these dimensions is substantially entirely overlapping with each other. Further, because each of the lens assemblies 14 and 16 is relatively thin, even when in the stowed position in overlapping relation to each other, the housing depth D can still be kept to a minimum. By way of example and not limitation, the width of the housing can be approximately three-fourths of an inch, the length L of the housing 12 can be approximately two and a half inches and the depth of the housing 12 can be approximately one half of an inch.

With the above-described housing 12, the apparatus 10 herein is well adapted to be easily fit into a person's clothing pocket as opposed to more conventional eyeglass cases that take up too much space and can stick out and/or be uncomfortable in a person's pocket. For this purpose, the spring mounting block 104 of the apparatus 10 herein can also include a pendent portion 148 at the housing end 124. The pendent portion 148 includes a through opening 150 so that the apparatus 10 can be attached to another item extending therethrough. This allows the present apparatus 10 to be carried on a key chain or the like such as with a key ring extending through the pendent through opening 150. As the housing 12 has a compact configuration, the apparatus 10 should readily fit on the key ring along with a person's keys while still being able to fit in their pocket so that it can be easily carried about and available for use. Further, attaching the housing 12 via the pendent 148 to a person's key ring also reduces the likelihood that the apparatus 10 will be lost.

FIGS. 7–9 show alternative lens assemblies 152 and 154 that differ from the lens assemblies 14 and 16 in their collar constructions. More particularly, annular collars 156 and 158 of the respective lens assemblies 152 and 154 are provided with facing cam surfaces 160 and 162 thereon.

With the collars 156 and 158 mounted on the pivot shaft 48, the cam surfaces 160 and 162 face each other in confronting relation and are urged against each other by a coil spring 163. As shown in FIG. 7, the coil spring 163 can be mounted in the housing 12 so that it pushes on the side of the collar 156 opposite to the side on which cam surfaces 160 thereof are formed. The cam surfaces 160 and 162 cooperate to allow the lens assemblies 152 and 154 to progressively shift to be aligned with each other in generally the same plane as they are pivoted to their operative, use position, and to progressively shift back to their offset position shown in FIG. 7 as they are pivoted to their stowed position to allow them to fit in overlapping relation to each other in the housing 12, as previously described.

For this purpose, the cam surfaces 160 and 162 each include peaks 164 and 166, respectively, at least two of which are in aligned engagement with each other with the lens assemblies 152 and 154 in their stowed position, as shown in FIG. 7. As the lens assemblies 152 and 154 pivot to their operative positions, the collars rotate in opposite directions about the pivot shaft 48. The cam surfaces 160 and 162 are provided with sloped surface portions 168 and 170 having an arcuate configuration in profile which terminate at valleys 172 and 174. As the collars 156 and 158 rotate oppositely with respect to each other, the peaks 164 and 166 move out of engagement with each other and the sloped cam surface portions 164 and 166 are urged against each other until the peaks 164 and 166 seat in the valleys 168 and 170 with the lens assemblies 152 and 154 pivoted to their operative positions and each of the collars 152 and 154 rotated ninety degrees and thus for a total of one-hundred and eighty degrees relative to each other.

Accordingly, in the use position, the lens assemblies 152 and 154 will be substantially coplanar or only slightly offset therefrom which should enhance viewing therewith over the offset therebetween that would otherwise be present absent the cooperating cam surfaces 160 and 162. As is apparent, the refractive viewing lens portions 78 and 80 will be designed with a particular configuration and material so that light is properly focused on user's retinas taking into account their particular eyesight defects. Assuming both eyes of the user have the same defect and depending on the degree of correction needed, the offset of the lens assemblies 14 and 16 can be problematic in terms of providing equal and proper eyesight correction when viewing therewith because of the different distances of the respective viewing lenses 78 and 80 from the corresponding eye of the user. Thus, the lens assemblies 152 and 154 which reduce this undesired offset will provide enhanced performance for vision correction purposes.

FIG. 10 depicts an alternative actuating mechanism 176 for the detent 20. As shown, the actuating mechanism 176 includes an elongate operating rod 178 that extends axially in the housing 12 between the ends 22 and 24 thereof. To this end, the operating rod 176 extends in the space between the offset, overlapping lens assemblies 14 and 16 when they are in their stowed position.

The housing end wall 138 is provided with a through aperture to allow the operating rod 178 to extend therethrough at end 182 thereof. At the end 182 of the operating rod 176, an enlarged actuation head 184 is formed for shifting the rod 176 axially in the housing 12. At end 186 of the rod 176 opposite the end 182 thereof, the rod 176 has an arcuate or concave surface 186 in engagement with the pivot shaft 82. The pivot shaft 82 by way of the springs 100 and 102 biases the rod 176 toward housing end 22 with the lock shaft 82 in the locked position thereof. To shift the lock shaft 82 to its release position, a user pushes on the actuating head 184 causing the lock shaft 82 in engagement with the arcuate surface 188 to shift against the bias provided by the springs 100 and 102 to the release position which, in turn, allows the lens assemblies 14 and 16 to shift from their stowed position to their use position, as previously described. The length of the operating rod 176 provides the user with a mechanical advantage to provide ease in shifting of the spring-loaded lock shaft 82 when operating the push actuating head 184 herein.

To keep the operating rod 176 centrally aligned in the housing space 30, the operating rod 176 has a guide slot 190 formed therein adjacent its end 182. The slot 190 allows the pivot shaft 48 to extend therethrough such that as the rod 176 reciprocates in the housing 12, the shaft 48 rides along the surfaces of the guide slot 190 as they shift axially and assists in keeping the rod 176 from becoming skewed relative to the housing axis 34. The slot 190 is elongated and sized sufficiently large in the axial direction to accommodate the axial movements of the rod 176 in the housing 12 necessary to shift the lock shaft 82 between its locked and release positions.

The actuating head 184 of the actuating mechanism 176 preferably includes a contoured engagement surface 192. The contour of the surface 192 provides comfort to the user when in engagement therewith. More specifically, the contoured engagement surface 192 can have a concave or dish-shaped configuration. In this manner, when a user operates the actuating mechanism 176 to pivot the lens assemblies 14 and 16 to their operative position, the user's finger can comfortably engage in and against the concave surface 192 for pushing the actuating head 184. further, with the lenses 14 and 16 in their operative position, the user can hold the apparatus via the housing 12 as previously described so that it extends up from between the eyes and use the actuating head 184 as the bridge piece that is provided with conventional eyeglasses resting the concave engagement surface 192 on their nose.

Figure 11:
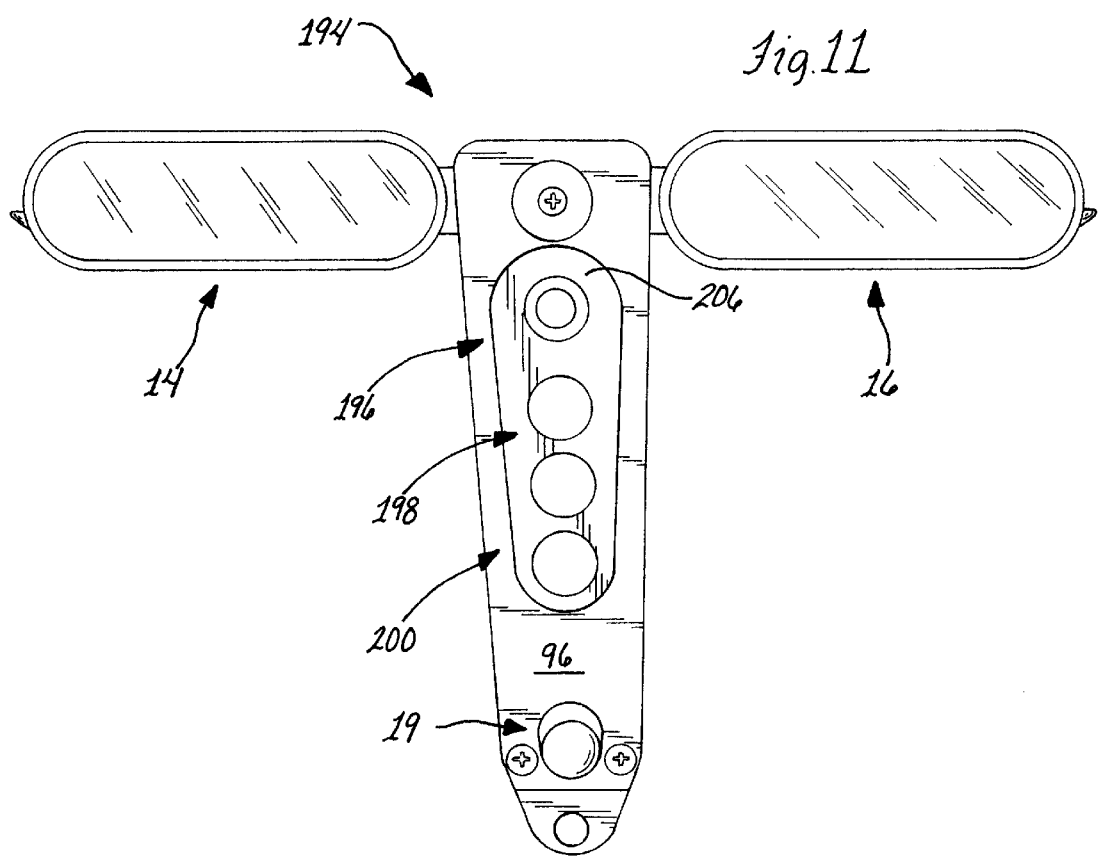
FIG. 11 is an elevational view of an eyeglass apparatus similar to the apparatus of FIGS. 1–6 and including a lighting module attached thereto.

FIGS. 11 and 12 are directed to an alternative lighted eyeglass apparatus 194 which has a light 196 mounted thereto to provided for illuminated viewing in the area about the lens assemblies 14 and 16. The light source 196 is selectively operable by a user via switch 198 also mounted to the housing 12 and which controls whether power from power source 200 is provided to the light source 196. To this end, the switch 198 can be an on/off switch 198 for selectively energizing the light source 196 between on and off states thereof.

The light source 196, the switch 198, and the power source 200 can all be provided in a small lighting module 202 that is its own separate unit and which is mounted on the surface 96 of the housing wall 27 between the housing ends 22 and 24 so as to avoid significantly increasing the size of the eyeglass apparatus 194 over the other apparatuses described herein. The light source 196 can be a small light emitting diode (LED) 204 mounted at end 206 of the module 202 adjacent the end 22 of the housing 12. In this manner, the LED 204 is generally disposed between the lens assemblies 14 and 16 when pivoted out to their use position. In this position, the LED 204 is well adapted to illuminate a user's desired viewing area as they look through the lens assemblies 14 and 16.

For example, if a user is in a dimly lit restaurant, the lighted eyeglass apparatus 194 can be advantageously utilized for reading menus. After a meal, the eyeglass apparatus 194 will be especially useful given the normal small print on restaurant invoices which a patron needs to read, and in a location where lighting is not often optimized for reading. Another example is where one is traveling as a passenger in a car at night and desires to read. Using the lighted eyeglass apparatus 194, the user can read without requiring that a dome light of the vehicle be turned on. Also, where one desires to read in bed while their spouse is sleeping, the apparatus 194 can be advantageously employed without resort to separate nightlights that can be overly bright and/or non-focused creating difficult sleeping conditions for the sleeping or trying to sleep spouse.

The light source 196, the switch 198 and the power source 200 can all be mounted to a printed circuit board (not shown) in the module 202 to provide the electrical interconnections between these components. The switch 198 can include a push button 208 having a raised or extended off position for electrically disconnecting the power from the power source 200 to the light source 196, and a depressed, on position for establishing the connection between the power from the power source 200 to the light source 196. The button 208 may normally be biased to its extended, off position so that power is provided only so long as the user is pushing the button 208 to its depressed, on position so as to provide a momentary on/off switch 208. The power source 200 can include a pair of small disc-shaped lithium batteries 210 as shown mounted in the module 202 at end 212 thereof opposite the module end 206 with the push button switch 208 mounted in the module 202 intermediate the batteries 210 and the LED 204.

As is apparent, the lighting module 202 is operable independent of whether the lens assemblies 14 and 16 have been pivoted out from the housing 12 via the release mechanism 19 to allow the apparatus 194 to be used as a small pocket flashlight whether or not the apparatus 194 is also being used as a pair of reading glasses.

As previously mentioned, the actuating mechanism 19 is best operated by gripping the housing 12 at end 22 thereof with one hand and with the other hand gripping and pulling the actuator heads 96 and 98 toward the housing end 24. In furtherance of this operation, FIGS. 13–15 show the housing 12 as including gripping areas 214 and 216 formed on respective housing members 26 and 28 at the upper end 22 of the housing 12. The gripping areas 214 and 216 provide a user with an indication of how the eyeglass apparatuses herein are to be actuated to their use position as by providing a visual guide to where the housing is to be gripped.

To this end, the gripping areas 214 and 216 can be knurled into the respective surfaces 96 and 98 of their housing member wall 27 and 29 to allow a user to get a better grip on the housing 12 thereat. As shown in FIG. 15, the knurling provided to the gripping areas 214 and 216 creates a plurality of ridges 218 that are raised from the surfaces 96 and 98 of the housing walls 27 and 29, respectively. By way of example, the ridges 218 can be spaced from each other by approximately 0.05 mm and can be raised from the associated housing surfaces 96 and 98 by approximately 0.025 mm. The gripping areas 214 and 216 can have an ovalized shape to more closely approximate the engagement surface needed by a user for gripping the areas 214 and 216 with their fingers.

Figure 16:
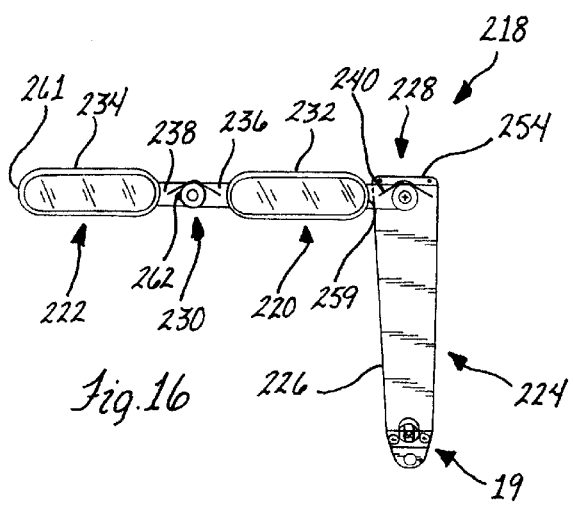
FIGS. 16–20 are elevational views of an alternative eyeglass apparatus in accordance with the invention showing the sequence of how the lenses pivot into and out from the housing from one side thereof one side thereof.
Figure 18:
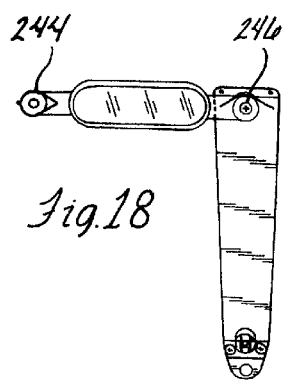
Figure 19:
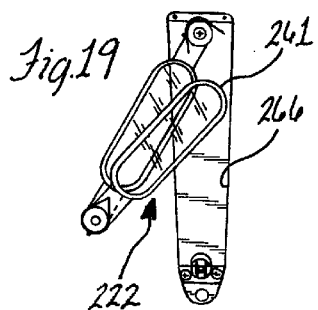
Figure 20:
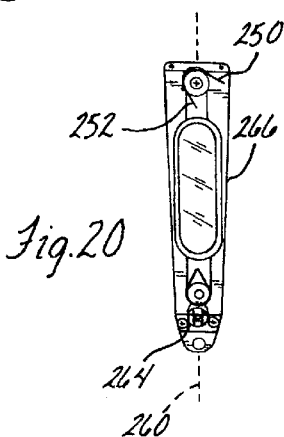

FIGS. 16–20 are to an alternative eyeglass apparatus 218 in which the lens assemblies 220 and 222 are shifted into and out from the housing 224 therefor from one side 226 thereof. For this purpose, the apparatus 218 employs a pair of shift or biasing mechanisms 228 and 230 that are operable upon use of the actuating mechanism 19 to cause the lens assemblies 220 and 222 to shift from the stowed position where they are in overlapping relation to each other as shown in FIG. 20 to the operative, use position where the lens assemblies 220 and 222 are in non-overlapping relation to each other as shown in FIG. 16. It will be appreciated that the alternative actuating mechanism 176 shown in FIG. 10 could also be used with the apparatus 218.

More particularly, the lens assemblies 220 and 222 are similarly constructed to lens assemblies 14 and 16 in that they are provided with rigid frames 232 and 234 integrally connected to extension end portions 236 and 238 at one end of the lens assemblies 220 and 222, respectively. The lens assembly 220 is additionally provided with an extension portion 240 at its opposite end to that of extension portion 236.

The biasing mechanisms 228 and 230 each include a torsion spring 242 and 244 similar to biasing mechanism 32 and torsion spring 108 thereof. The torsion spring 242 acts to bias both of the lens assemblies 220 and 222 out through side opening 226 of the housing 224. The torsion spring 244 acts to bias the lens assembly 222 so that it shifts relative to lens assembly 220 to be a non-overlapping relation thereto. For this purpose, the shift mechanism 228 includes a pivot mount 246 in the housing 224 which pivotally connects the lens assembly 220 and, in particular, the extension portion 240 thereof to the housing 224 so that it pivots between its stowed position and use position. The shift mechanism 230 also includes a pivot mount 248 attached between the lens assemblies 220 and 222. More specifically, the pivot mount 248 pivotally attaches the extension portions 236 and 238 of the respective lens assemblies 220 and 222 together to allow them to pivot between being in overlapping and non-overlapping relation relative to each other.

The torsion spring 242 has oppositely biased arms 250 and 252 attached to the housing 224 and to the extension portion 240 of the lens assembly 220, respectively. In this manner, the spring 242 acts to spring load the lens assembly 220 to its operative position external of the housing 224 with the extension portion 240 pivoting about the pivot mount 246 until engaged against end wall 254 of the housing 224. This pivoting of the lens assembly 220 also allows the shift mechanism 230 to pivot the lens assembly 222 about pivot mount 248. Oppositely biased spring arms 256 and 258 of the torsion spring 244 are attached to respective lens extension portions 236 and 238. In the stowed position, the end portions 236 and 238 are aligned with each other along housing longitudinal axis 260 (FIG. 20), and in the use position, the end portions 236 and 238 are aligned with each other in a direction transverse, and as preferred and illustrated normal to the axis 260 with lens assembly 220 proximate the housing 224 and lens assembly 222 distal therefrom (FIG. 16). Further, the lens frames 232 and 234 include respective arcuate ends 259 and 261 that are adjacent to each other in the stowed position and when the lenses 220 and 222 are pivoted to the operative position, the lens frame ends 259 and 261 are non-adjacent to each other and aligned in the normal direction to axis 260.

To maintain the lens assemblies 220 and 222 in the stowed position, the lens assembly 220 is provided with a cam 262 projecting from the end of extension portion 236 thereof adjacent pivot mount 248. The apparatus 218 is provided with a detent similar to previously described detent 20 and thus includes a spring biased lock shaft 264 that cooperates with an abutment surface on the cam 262 when the lens assembly 220 is pivoted into the housing 224 to restrain the lens assembly 220 from pivoting out of the housing 224 under the influence of torsion spring 242. Because the cam 262 is provided on end portion 236 rather than the frame 232, the housing 224 for the eyeglass apparatus 218 is longer along its axis 260 than the corresponding housing 12 of eyeglass apparatus 10 where the lens frames are the same size.

With the lens assemblies 220 and 222 held in the stowed position by way of the cam 262 and the lock shaft 264, the lens assembly 222 can be restrained from pivoting relative to lens assembly 220 by the provision of a side wall 266 disposed opposite side opening 226 of the housing 224. The side wall 266 can be provided as, in contrast to the previously described eyeglass apparatuses herein, the lens assemblies 220 and 222 of eyeglass apparatus 218 only shift into and out from the single side opening 226 of the housing 224.

To deploy the lenses 220 and 222, a user shifts the lock shaft 264 to provide clearance for the cam 262 with the spring arm 252 pivoting the lens assembly 220 and the lens assembly 222 pivotally attached thereto out from the housing 224. With the lens assemblies 220 and 222 pivoted away from side wall 266, the spring arm 258 can then pivot the lens assembly 222 so that it is no longer in overlapping relation to lens assembly 220 (FIG. 19), and progressively shifts to be preferably laterally aligned relative thereto in its use position so that the lens assemblies 220 and 222 can be used for viewing.

Figure 17:
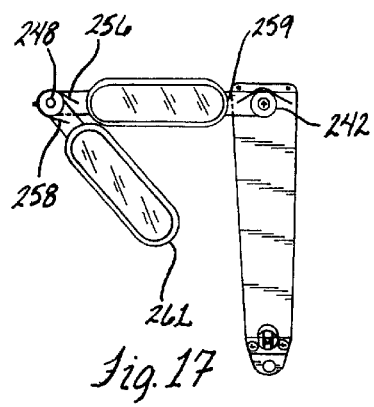

When a user wants to stow the lenses 220 and 222, they pivot the distal lens assembly 222 from its operative position against its bias about the pivot mount 248, as shown in FIGS. 17 and 18. Then the user pivots both lens assemblies together toward the housing side opening 226 while holding them together. Releasing the lens assemblies causes lens assembly 222 to pivot until it engages the housing wall 266, as shown in FIG. 19. Continued pushing and pivoting of the lens assembly 220 through the housing opening 226 to its stowed position causes the lens assembly 222 to pivot back to alignment with lens assembly 220 as the arcuate end 261 of lens assembly 222 is cammed along the wall 266 toward the pivot mount 246.

FIGS. 21–23 are to another lighting module 268 similar to that shown in FIGS. 11 and 12. The lighting module 268 includes a small housing 270 that is attached to the cover member wall 27 of eyeglass apparatus housing 12. To clamp the module housing against the outer surface 96 of the housing wall 27, the fastener 132 is inserted through an aperture in the housing 270 that is aligned with the aligned apertures at the end 22 of the housing 12 for receipt of the fastener 132 therethrough, as previously described. Further, the housing wall 27 can be modified with an intermediate aperture aligned with another aperture in the housing 270 into which fastener 272 is fixed.

The housing 270 includes three main compartments, 274–278. The compartment 274 is adapted to receive the light source or LED 280 therein. The compartment 274 includes a shoulder 275 against which base 281 of the LED 280 is abutted with the LED 280 projecting slightly out from opening 274a of chamber 274. The compartment 274 is adjacent housing end 22 with the module 268 mounted to the housing wall 27. In this manner, the LED 280 is generally disposed between the lens assemblies 14 and 16 in their use position for illumination of the viewing area, as previously described.

The power source for the LED 280 is preferably a pair of lithium batteries that are received in compartments 276 and 278. The batteries 282 and 284 are biased by a battery leaf spring 286 toward outer wall 288 of the module housing 270. The leaf spring 286 also can provide electrical connection between the batteries 282 and 284. The housing 270 includes a channel 291 which extends from LED compartment 274, alongside battery compartment 276 and between it and the housing wall 288 before opening into the area of battery compartment 278. The LED 280 can include resilient leads generally designated 290 that are run between the module wall 288 and the batteries 282 and 284 via the portion 291a of channel 291. A pair of leads 290a and 290b are shown with an insulator 295 therebetween and lead 290a engaged and electrically connected to battery 282. The leads 290 complete the circuit with the batteries 282 and 284 via switch push button 292 mounted in a stepped through opening 294 of the module housing 270 in alignment with battery chamber 278. Thus, distal portion 296 of the lead 290b extending beyond lead 290a and out from channel portion 291a normally biases the switch button 292 to its extended position with the distal lead portion 296 spaced from the battery 284 and flange 292a of the button engaged against shoulder 294a in the stepped opening 294. Depressing the button 292 pushes the resilient lead portion 296 into electrical contact with the battery 284 to complete the circuit for providing power to the LED 280 and generating light for the eyeglass apparatus herein. When the button 292 is released, the LED 280 is de-energized so that the button 292 provides a momentary-type switch for the module 268.

Another feature that can be provided with the eyeglass apparatus 10 of FIGS. 1–6 is a voice recorder/playback device or digital memo recorder 298, as shown in FIG. 24. As will be appreciated, a user employing the eyeglass apparatus 10 herein for reading may desire to record their thoughts on the subject at hand. With eyeglass apparatus 300 including the digital memo recorder 298, users do not need to make handwritten notes or carry a separate or stand-alone voice recording mechanism, and instead can record their thoughts into the memo recorder 298 for being replayed later at a convenient time.

As shown, the digital memo recorder can include microphone/speaker 302, switch 304, memory chip 306, and battery 308. Each of the above components of the memo recorder 298 can be self-contained in a module or small housing 310 attached to the eyeglass apparatus housing wall 27 in a manner similar to that of the previously described lighting modules 202 and 268. Accordingly, when a user wants to record a message such as when the are viewing reading material through the lens assemblies 14 and 16 with the eyeglass apparatus 300 herein, they simply depress the memo recorder switch 304 so that their voice is digitally recorded via microphone 302 and memory chip 306. For playing back recorded messages, the user depresses the switch 304, for example, a different number of times than that needed for voice recording or, alternatively, separate record and playback switches (not shown) can be provided.

Rather than recording one's thoughts, a user may wish to jot down notes on information they have just read and it is to this need that apparatus 312 is directed. As shown in FIGS. 25–27, the eyeglass/writing apparatus 312 is shown and includes a writing portion 314 that depends from the end 24 of the housing 12 of the eyeglass apparatus 10. In this regard, the writing portion 314 can be integrated with the spring mounting block 104 so as to extend therefrom, and thus is attached to the housing end 22 via the fasteners 134. In the preferred and illustrated form, the eyeglass/writing apparatus 300 utilizes the actuating mechanism 176 for the detent 20 as described with respect to FIG. 10, although it is also contemplated that the apparatus 312 could be implemented with the actuating mechanism 19. The writing portion 314 includes an elongate barrel housing 316 having a tapered end 318 distal from the end 22. Manifestly, the writing portion 314 could either be of the pencil or pen type of writing implement. In the illustrated pen type implement, there is a tubular ink holder or cartridge 320 extending for substantially the full length of the barrel housing 316 of the writing portion 314 and filled with liquid ink for being fed to writing tip 322, such as a ball-point pen tip projecting beyond the bottom of the writing portion housing tapered end 318.

Due to the highly compact nature of the eyeglass apparatus 10, as previously described, e.g. length of approximately two and a half inches, the length of the writing portion 314 can be sized so that the overall length of the eyeglass/writing apparatus 312 is approximately the same as that of a typical writing implement, e.g. approximately five and a half to six inches in length. Accordingly, the writing portion 314 can add approximately three inches in length to the housing 12 and still not take up anymore space in the lengthwise direction than a typical writing implement, while providing the additional benefit of viewing enhancement via the lens assemblies 14 and 16 thereof. For carrying purposes, the eyeglass/writing apparatus 312 can include a resilient pocket clip 324 attached to the wall 29 and extending along its length, as shown in FIGS. 26 and 27.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

I claim:

1. An eyeglass apparatus comprising:
a pair of lenses for viewing therethrough;
a handle housing for the lenses in which the lenses are disposed in a stowed position with the lenses overlapping each other in the housing to conserve space therein; and
a pivot mount of the housing to which the lenses are operably connected for pivoting the lenses out from the housing to a use position with the lenses spaced in non-overlapping relation to each other,
wherein the lenses include a shift mechanism attached between the lenses for shifting the lenses from the stowed position with the lenses overlapping to the use position in non-overlapping relation to each other.

2. The eyeglass apparatus of claim 1 wherein the lensee each include first and second ends with the first ends of the lenses being generally adjacent to each other in the stowed position, and the shift mechanism is a pivot attachment between the second ends of the lenses operable to pivot the lenses thereabout so that the first ends of the lenses are non-adjacent and generally aligned with each other in the use position.

3. An eyeglass apparatus comprising:
a pair of lenses for viewing therethrough;
a handle housing for the lenses in which the lenses are disposed in a stowed position with the lenses overlapping each other in the housing to conserve space therein;
a pivot mount of the housing to which the lenses are operably connected for pivoting the lenses out from the housing to a use position with the lenses spaced in non-overlapping relation to each other; and
an actuating mechanism operable by a user to release the lenses from the stowed position for pivoting to the use position thereof.

4. The eyeglass apparatus of claim 3 wherein the housing includes an end portion in which the pivot mount is disposed, and the actuating mechanism includes a push actuator mounted to the housing end portion and including a contoured surface thereon for engagement by a user.

5. The eyeglass apparatus of claim 3 wherein the housing includes spaced end portions with one of the end portions containing the pivot mount, and the actuating mechanism includes a pull actuator mounted to the housing end portion opposite the one end portion.

6. An eyeglass apparatus comprising:
a pair of lenses for viewing therethrough;
a housing for the lenses in which the lenses are disposed in a stowed position with the lenses overlapping each other in the housing to conserve space therein; and
a pivot mount of the housing to which the lenses are operably connected for pivoting the lenses out from the housing to a use position with the lenses spaced in non-overlapping relation to each other,
wherein the housing includes side openings, the lenses are both directly connected to the pivot mount for pivoting out from respective ones of the side openings, and
cam surfaces of the lenses which cooperate to shift the lenses from being offset to each other in the stowed position to being substantially coplanar in the use position.

7. An eyeglass apparatus comprising:
a pair of lenses for viewing therethrough;
a small housing in which the lenses are stowed when not in use; and
a detent cooperating between the lenses and housing to retain the lenses in the housing in a stowed position of the lenses and to release the lenses for shifting out from the housing in a use position of the lenses with the housing being disposed between the lenses to use as a handle for viewing through the lenses.

8. The eyeglass apparatus of claim 7 wherein the housing includes a pivot shaft to which the lenses are pivotally mounted, and operation of the detent causes pivoting of the lenses about the shaft between the stowed and use positions thereof.

9. The eyeglass apparatus of claim 7 wherein the detent includes a lock member in the housing urged to a locked position with a predetermined bias force, and the lenses each include a cam which shift the lock member against the bias force as an incident of shifting the lens associated therewith between use and stowed positions thereof and which cooperate with the lock member to retain the lenses in the stowed position.

10. The eyeglass apparatus of claim 9 wherein the lenses each include a substantially rigid frame extending thereabout and the cams of the lenses are each integrally formed with the respective frames.

11. The eyeglass apparatus of claim 9 wherein the detent includes an actuator connected to the lock member and disposed external of the housing to allow a user to shift the lock member against the bias force for releasing the lenses from the stowed position thereof.

12. The eyeglass apparatus of claim 9 wherein the lock member comprises a shaft shiftable along a first axis, and the cams each include a cam surface that is inclined relative to the first axis with the cam surface engaged against the shaft and an abutment surface that extends generally parallel to the first axis with the abutment surface engaged against the shaft.

13. The eyeglass apparatus of claim 7 wherein the housing includes a longitudinal axis, and the lenses pivot between the stowed position generally aligned along the housing axis and the use position extending transverse to the housing axis.

14. The eyeglass apparatus of claim 7 wherein the housing includes side openings through which the respective lenses shift between stowed and use positions thereof.

15. The eyeglass apparatus of claim 7 wherein the housing includes an end portion having a through opening to allow the housing to be attached to another item extending through the through opening.

16. The eyeglass apparatus of claim 7 wherein the housing includes a lighting unit to allow for illuminated viewing through the lenses.

17. An eyeglass apparatus comprising:
- a pair of lens assemblies each including a lens and a frame extending about the lens;
- a housing for the lens assemblies having a pair of opposite side openings through which the lens assemblies are shifted; and
- a biasing mechanism that urges the lens assemblies out through the side openings for viewing therethrough.

18. The eyeglass apparatus of claim 17 wherein the housing includes a pivot shaft, the lens assemblies each include an inner portion pivotally mounted to the pivot shaft, and the biasing mechanism includes a single spring between the pivot shaft and the inner portions that urges both of the lens assemblies for pivoting through the respective housing side openings.

19. The eyeglass apparatus of claim 17 wherein the frame of one of the lens assemblies is distinct from the frame of the other lens assembly.

20. The eyeglass apparatus of claim 17 wherein the lens assemblies have a predetermined use position aligned and spaced laterally from each other, and the housing has a predetermined width smaller than the spacing between the aligned lens assemblies in the use position thereof.

21. The eyeglass apparatus of claim 17 wherein the housing includes a pair of spaced walls with the housing side openings defined by the spacing between the walls.

22. A lighted eyeglass apparatus comprising:
- a pair of lenses;
- a compact housing in which the lenses are stowed when not in use;
- a release mechanism between the housing and lenses operable by a user to shift the lenses out from the housing for use thereof; and
- a light of the housing operable by a user to illuminate an area about the lenses.

23. The lighted eyeglass apparatus of claim 22 wherein the release mechanism and the light are independently operable by a user.

24. The lighted eyeglass apparatus of claim 22 wherein the light includes a switch and a power supply mounted to the housing for selectively energizing the light between on and off states thereof.

25. The lighted eyeglass apparatus of claim 22 wherein the lenses have a predetermined use position aligned and spaced laterally from each other in a first direction, the housing has ends spaced in a second direction from each other normal to the first direction with one of the ends substantially disposed between the laterally spaced lenses, and the light is mounted adjacent the one end of the housing for illuminating the area about the lenses in the use position thereof.

* * * * *